United States Patent [19]

Nishida et al.

[11] 4,266,518
[45] May 12, 1981

[54] METHOD OF CONTROLLING IGNITION TIMING FOR INTERNAL COMBUSTION ENGINES AND APPARATUS FOR CARRYING OUT THE SAME

[75] Inventors: Minoru Nishida; Tadashi Hattori, both of Okazaki; Hiroaki Yamaguchi, Anjo, all of Japan

[73] Assignee: Nippon Soken, Inc., Nishio, Japan

[21] Appl. No.: 949,255

[22] Filed: Oct. 6, 1978

[30] Foreign Application Priority Data

Nov. 18, 1977 [JP] Japan .................... 52-139092
Feb. 1, 1978 [JP] Japan .................... 53-10197

[51] Int. Cl.³ .............................................. F02P 5/04
[52] U.S. Cl. ................................................. 123/416
[58] Field of Search ........ 123/117 R, 117 D, 146.5 A

[56] References Cited

U.S. PATENT DOCUMENTS

| | | | |
|---|---|---|---|
| 4,081,995 | 4/1978 | Griffith et al. | 123/117 D X |
| 4,130,097 | 12/1978 | Ford | 123/117 D X |
| 4,131,097 | 12/1978 | Sawada et al. | 123/117 D X |
| 4,166,440 | 9/1979 | Helava et al. | 123/117 D X |

Primary Examiner—Tony M. Argenbright
Attorney, Agent, or Firm—Cushman, Darby & Cushman

[57] ABSTRACT

Method and apparatus is provided for calculating an optimum ignition timing for an internal combustion engine on the basis of values set in dependence on operating conditions of the engine. With a view to prevent ignition times in two successive cycles from differing remarkably from each other, the ignition time or angle for the current cycle is controlled with reference to the ignition time or angle in the just preceding cycle. As one example of the control, in the case where the ignition time electronically anticipated for the current cycle appears to have deviated from the preceding ignition time by more than a predetermined value, the anticipated ignition time is modified to result in the optimum ignition time by adding to or subtracting from the anticipated ignition time a predetermined value. Alternatively, the optimum ignition time may be given by a mean value of the anticipated ignition time and a plurality of the preceding ignition times.

6 Claims, 9 Drawing Figures

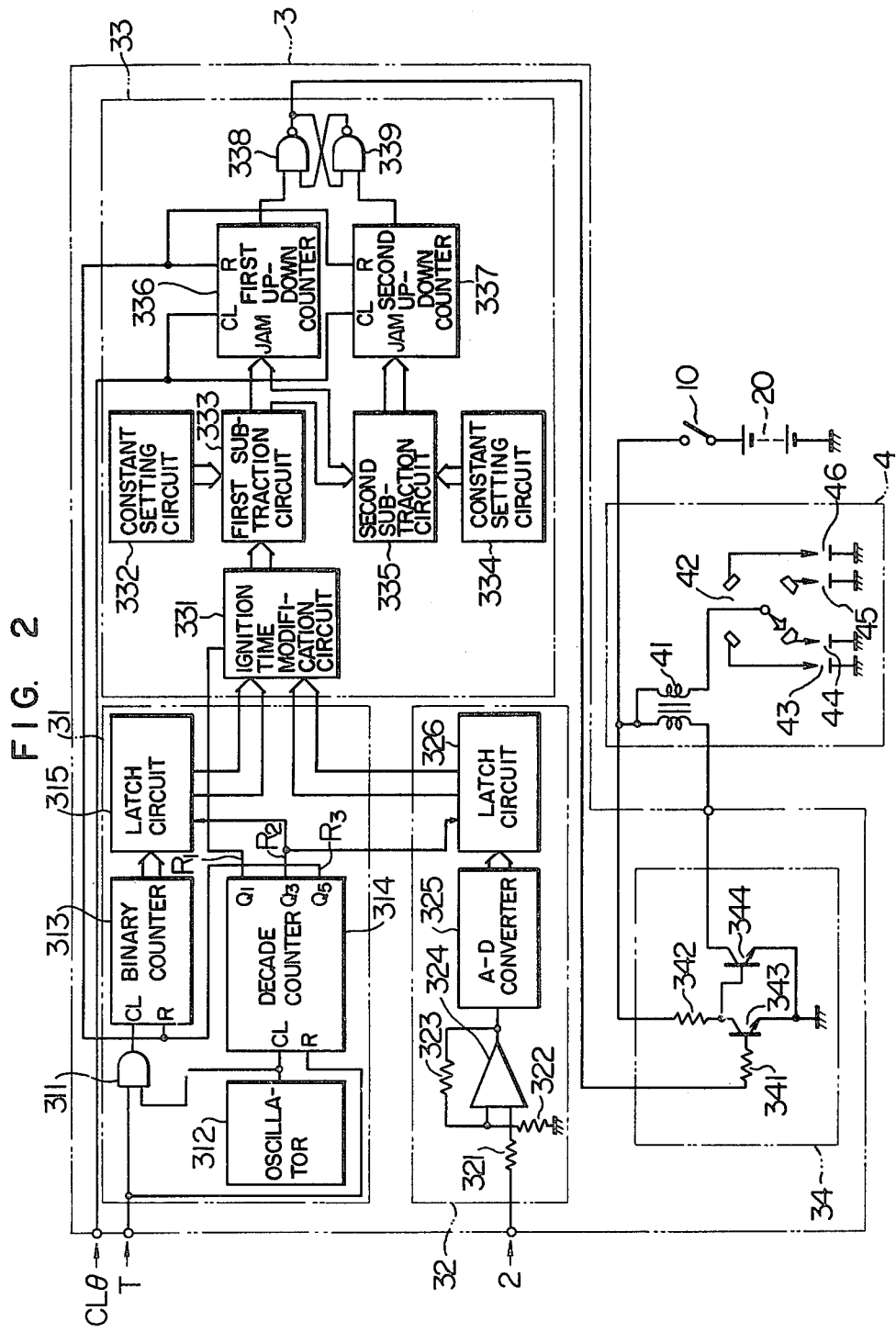

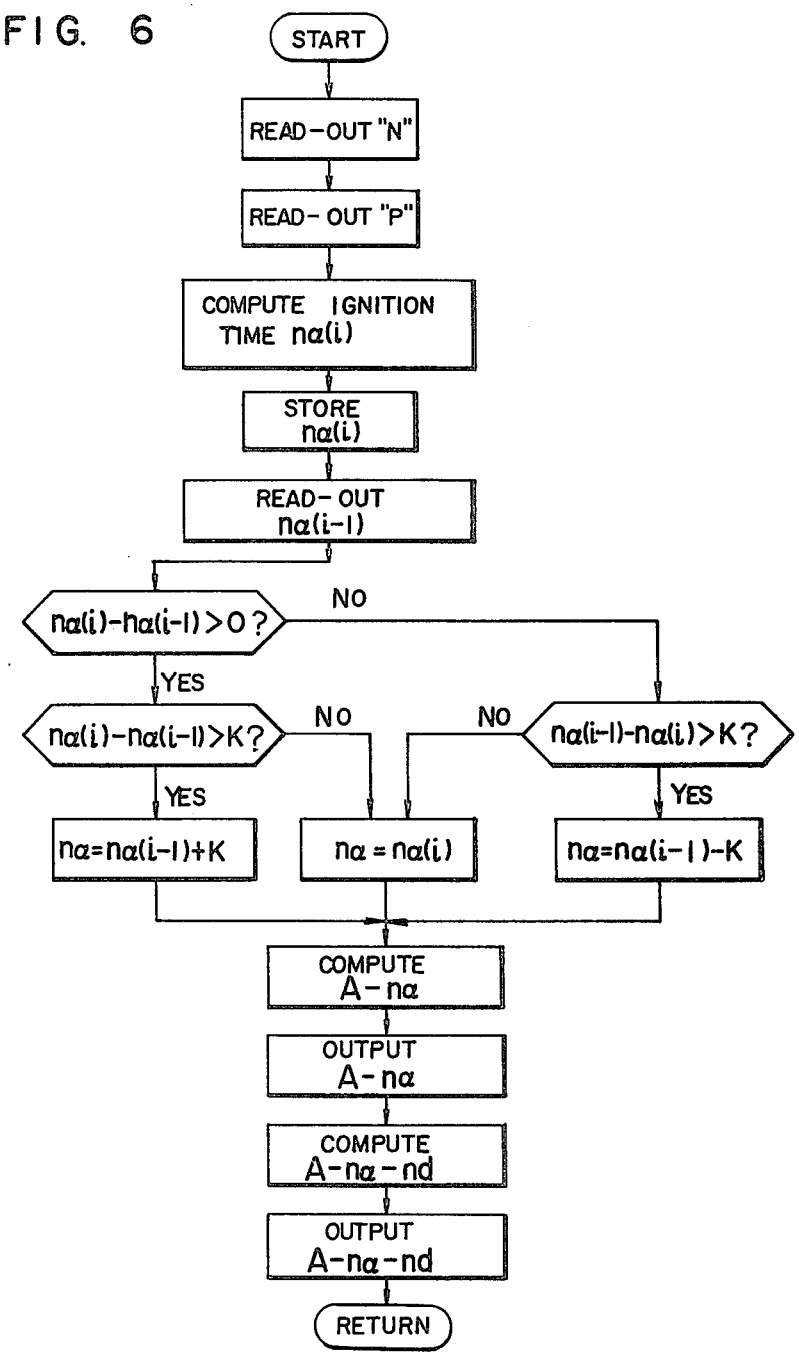

METHOD OF CONTROLLING IGNITION TIMING FOR INTERNAL COMBUSTION ENGINES AND APPARATUS FOR CARRYING OUT THE SAME

BACKGROUND OF THE INVENTION

1. Field of the Invention

The present invention relates to a method and apparatus for controlling the ignition time or angle for every rotation cycle of the output shaft of an internal combustion engine in dependence on the operating conditions thereof. More particularly, the invention concerns the ignition timing control of the above type where means is provided to prevent the ignition times in any two successive rotation cycles from differing remarkably from each other.

2. Description of the Prior Art

Recently, strict requirements have been imposed on the internal combustion engines for motor vehicles in respect of reduction in consumption of fuel and purification of the exhaust gases. In order to meet such requirements, the ignition timing of the engine has to be controlled with high accuracy in dependence on the operating state of the engine. For example, a parameter representing an operating condition of the engine such as the number of rotations is finely divided into a number of gradations thereby to control the ignition timing as a function of such a finely graded parameter. Certainly, the above requirement may be satisfied by such fine ignition timing control. However, there arises the possibility that the ignition timing undergoes significant variation in response to even a slight change in the operation state of the engine, bringing about correspondingly large variation in the output torque of the engine and instability in the engine operation.

In general, it is considered most preferable that the ignition be effected with a minimum advance angle at the maximum torque (i.e. minimum advance for best torque or MBT) in view of the operation and fuel consumption efficiency of the engine. However, when the ignition timing is advanced excessively, there may occur a so-called knocking phenomenon. In order to assure stable operation, the ignition timing has to be adjusted so that such knocking phenomenon is suppressed.

From the viewpoint of a high purification ratio of the exhaust gas, the ignition timing of the engine has to be controlled finely, which in turn involves a steep ignition timing control characteristic, i.e. the ignition timing control is very sensitive to variation in the operating condition of the engine. With such a steep characteristic of the ignition timing control, even a slight transient variation in the operating state of the engine will give rise to a significant hunting phenomenon in addition to a remarkable degradation in the operation stability of the engine.

SUMMARY OF THE INVENTION

Accordingly, an object of the invention is to provide an improved ignition timing control for an internal combustion engine which avoids the disadvantages of the hitherto known control systems described above.

Another object of the invention is to provide an improved ignition timing control in which ignition time points or angles in any two successive rotation cycles of the engine are so adjusted that the difference therebetween may not exceed a predetermined magnitude.

According to an aspect of the invention, the current ignition time electronically predicted is always compared with the preceding ignition time. If the difference resulting from the comparison exceeds a predetermined value, the ignition time or angle for the current cycle is adjusted by adding to or substracting from the ignition time or angle a predetermined value. For the comparison, a mean value of the ignition times or angles over a plurality of preceding cycles may be used.

BRIEF DESCRIPTION OF THE DRAWINGS

FIG. 2 is a block diagram showing a general arrangement for carrying out the ignition timing control according to a first embodiment of the invention.

FIG. 6 is a flow chart to illustrate operation of a micro-computer employed in the arrangement shown in FIG. 5.

DETAILED DESCRIPTION OF THE PREFERRED EMBODIMENTS

Figure 1:
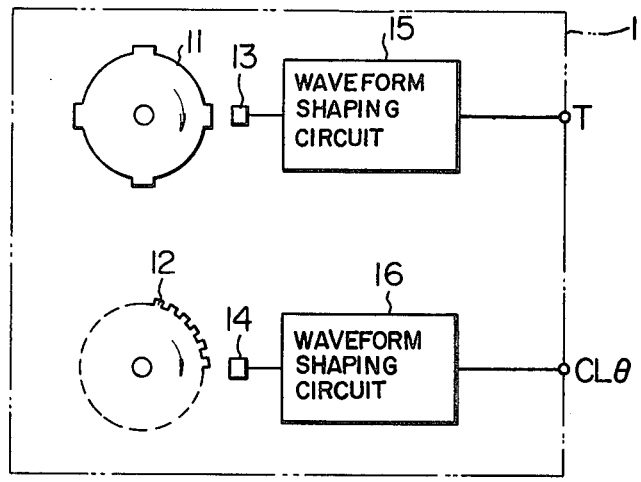
FIG. 1 is a schematic diagram of a device for producing parameter signals representative of an operating condition of an internal combustion engine.

In carrying out the ignition timing control according to the teachings of the invention, signals representative of the operating conditions of an internal combustion engine are utilized. Assuming that the engine is of a four-cycle four-cylinder type, such a signal may comprise a reference signal T which may be a series of pulses produced at a repetition rate of four pulses for each revolution of the shaft of a distributor and each having a predetermined angular interval $T\theta$, an angle signal $CL\theta$ constituted by a series of pulses produced at a repetition rate of 720 pulses for a single rotation of the distributor shaft and a signal representative of a negative pressure in an intake conduit, by way of example. An arrangement for producing the signals T and $CL\theta$ is shown schematically in FIG. 1. Referring to this figure, the apparatus denoted generally by reference numeral 1 may be referred to as an angle detector and is composed of a first rotor or wheel 11 mounted on the distributor shaft and having four teeth or projections formed equidistantly on the periphery. An electromagnetic position detector 13 of an oscillator type is associated with the toothed wheel 11 for producing a single pulse each time the tooth of the toothed wheel 11 passes by the position detector 13. The output signal from the detector 13 is supplied to a signal waveform shaping circuit 15 the output signal from which is the reference signal T having a predetermined angular interval or pulse width $T\theta$, each pulse having a leading edge appearing at the upper dead points of the individual cylinders. Further, a second toothed wheel 12 is mounted on the distributor shaft and formed with 720 equidistantly set peripheral teeth or projections. Provided in association with the second toothed wheel 12 is an electromagnetic position detector 14 followed by a signal waveform shaping circuit 16, the output signal of which is the angle signal CL$\theta$ constituted by a train of pulses each produced for a crank angle of 1°. The waveforms of the signals T and CL$\theta$ are illustrated at (a) and (b) in FIG. 4 described hereinafter.

FIG. 2 is a block diagram showing a general arrangement of an apparatus for implementing the teachings of the invention. In this figure, reference numeral 3 denotes an arithmetic unit for determining the ignition timing in dependence on the operating conditions of the engine. To this end, the arithmetic unit 3 has inputs connected to the output terminals T and CL$\theta$ of the angle detector circuit 1 shown in FIG. 1 and other input coupled to a pressure detector of a conventional type for detecting the negative suction pressure in the intake conduit of the engine. Connected to the output of the arithmetic unit 3 for determining the ignition timing is an ignition circuit 4 for producing the ignition sparks in the individual cylinders in accordance with the ignition timing determined by the arithmetic unit 3.

The arithmetic unit 3 is composed of a first detector circuit 31 for detecting the operation speed of the engine, a second detector circuit 32 for sensing the negative suction pressure in the intake conduit of the engine, an ignition timing circuit 33 for determining the igniton timing, and an ignition coil control circuit 34 for turning on and off the primary circuit of an ignition coil in dependence on the output signal of the ignition timing control circuit 33. More specifically, in FIG. 2 the first detector circuit 31 comprises an AND gate 311 having an input applied with reference signal T, an oscillator circuit 312 of a conventional type for producing a pulse signal of a high repetition frequency, a binary counter 313, a decade counter 314 having a reset input applied with the reference signal T and a clock input supplied with the output clock signal from the oscillator circuit 312 and having decoded output for producing clock pulses sequentially starting from the trailing or falling edge of the reference signal T (the counter 314 may be constituted by CD 4017 available commercially from RCA Corporation), and a storage or memory element 315 (hereinafter referred to as latch circuit). With the above arrangement of the engine speed detector circuit 31, the clock pulses of logic "1" appearing at the output of the decade counter 314 during the duration of the reference signal T or during a time corresponding to a predetermined crank angle are counted by the binary counter 313 and the number of the counts is stored in the latch circuit 315 for every half revolution of the engine, thereby to detect the engine speed. On the other hand, the second detector circuit 32 has an input coupled to the output of the pressure detector 2 and is composed of an amplifier circuitry having an operational amplifier 324 with resistors 321, 322 and 323, an A-D converter 325 for converting the analog output from the amplifier circuit into corresponding digital quantity, and a latch circuit 326 for storing the digital output signal from the A-D converter 325 for every half revolution of the engine, thereby to detect the negative suction pressure. The output signals from the first and the second detector circuits 31 and 32 which represent the engine speed N and the negative suction pressure P, respectively, are supplied to the ignition timing determining circuit 33.

The ignition timing determining circuit 33, the detailed circuit configuration of which is shown in FIGS. 3, 5, 7, 8 and 9, includes constant circuits 332 and 334 for setting constants A (A=180−T$\theta$) and nd (angular interval for energizing ignition coil) which may be composed of switches for setting the corresponding binary codes; a first subtraction circuit 333 of a conventional type for subtracting the output n$\alpha$ of an ignition time limiter or modification circuit 331 from the output A of the constant setting circuit 332; a second subtraction circuit 335 for subtracting the output nd of the constant setting circuit 334 from the difference output (A−n$\alpha$) of the first subtraction circuit 333; a first up-down counter 336 (such as CD 4029 of RCA Corporation) having JAM input applied with the output (A−n$\alpha$) from the first subtraction circuit 333, a clock input terminal applied with the angle pulse signal CL$\theta$ and a reset input terminal applied with the output from the decade counter 314 for counting down the count corresponding to the difference (A−n$\alpha$); a second similar up-down counter 337 for counting down the count corresponding to the difference output (A−n$\alpha$-nd) from the second subtraction circuit 335; and a flip-flop circuit comprised of NAND gates 338 and 339 having inputs connected to the up-down counters 336 and 337, respectively. The above characters "A" and "nd" designate constants predetermined corresponding to engine operating conditions, which are later explained.

The ignition coil control circuit 34 is composed of resistors 341 and 342 and transistors 343 and 344 and serves to control the turn on and off of the primary current of the ignition coil. The ignition device 4 includes the ignition coil 41, distributor 42, ignition plugs 43, 44, 45 and 46, wherein spark is produced at the plugs 43, 44, 45 and 46 associated with the individual cylinders evey time when the primary current of the energized ignition coil 41 is cut off, as is well known in the art. Reference numerals 10 and 20 denote a key switch and a DC power source, respectively.

Figure 3:
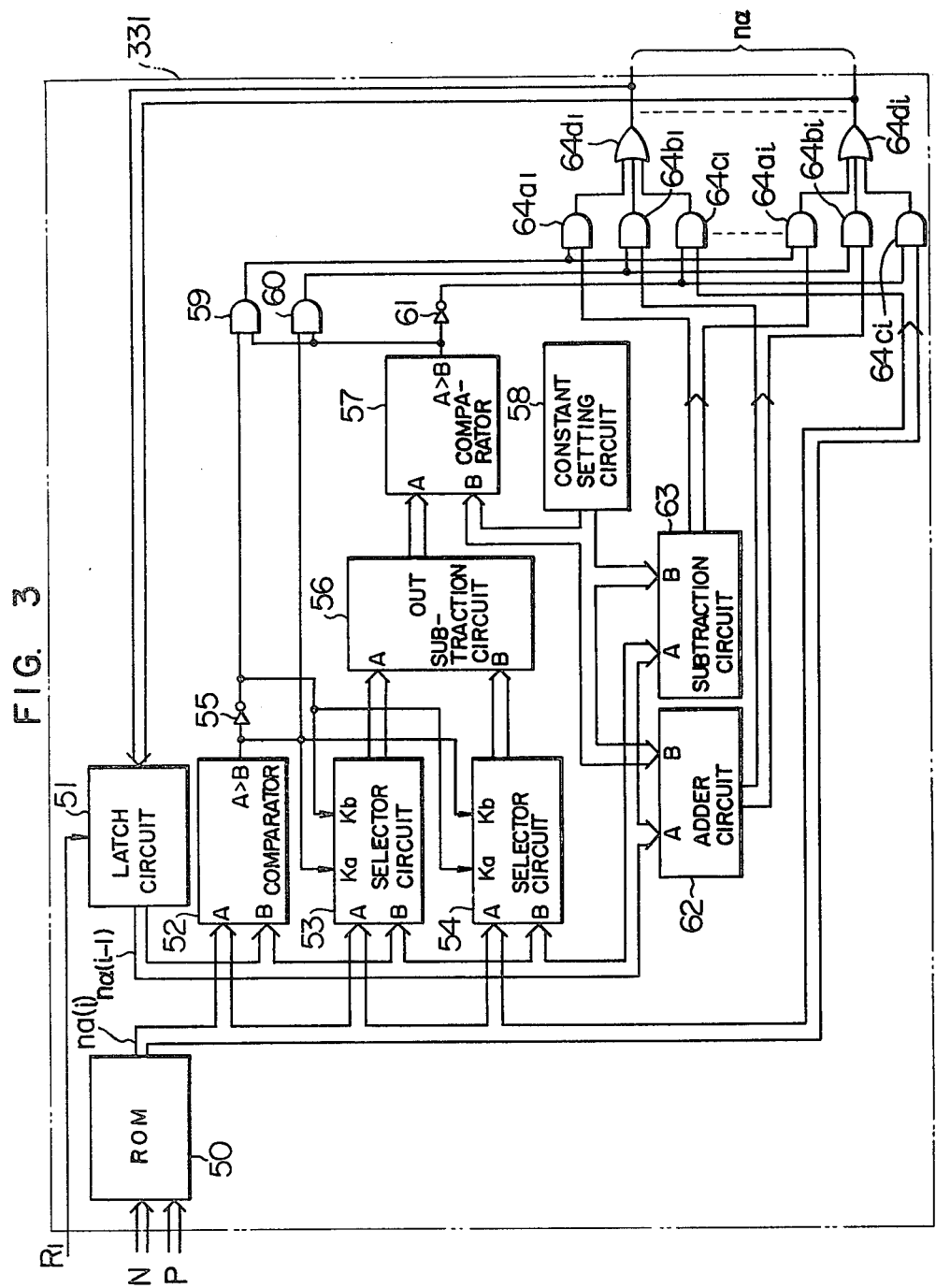
FIG. 3 is a schematic circuit diagram showing a main portion of the arrangement shown in FIG. 2.

Referring to FIG. 3, the ignition time limiting or modification circuit 331 comprises the following elements; namely, a read-only memory 50 (hereinafter referred to as ROM) serving as program storing means; a latch circuit 51 for storing the preceding ignition time signal n$\alpha$(i−1) for a delayed time corresponding to a half revolution of the engine; a comparator circuit of a known configuration (such as CD 4063 of RCA Corporation) 52 for comparing the output signal n$\alpha$(i) of the ROM 50 and the output N$\alpha$(i−1) of the latch circuit 51 with each other thereby to produce an output signal of logic "1" level when n$\alpha$(i)>n$\alpha$(i−1); NOT circuit 55; a selector circuit 53 (e.g. CD 4019 of RCA Corporation) having an input A applied with the signal n$\alpha$(i), an input B applied with the signal n$\alpha$(i−1), a control input Ka coupled to the output of the comparator circuit 52 and a second control input Kb coupled to the output of the NOT gate 55 thereby to produced the output signal n$\alpha$(i−1) when the input signal Kb is logic "1" while producing the output signal n$\alpha$(i) in response to the signal Ka of the logic "1" level; a second selector circuit 54 having an input A applied with n$\alpha$(i), an input B applied with the signal n$\alpha$(i−1), a control input Kb connected to the output of the comparator circuit 52 and other control input Ka connected to the output of the NOT circuit 55; a subtraction circuit 56 of a known type for producing the difference signal (A−B); a constant setting circuit 58 for setting a constant K; a comparator circuit 57 for comparing the output from the subtraction circuit 56 with the constant K; and AND gates 59 and 60; a NOT gate 61; an adder circuit 62 of a known type for producing a sum signal of n$\alpha$(i−1)

and the constant K; and AND gates 64*al* to 64*ai,* AND gates 64*bl* to 64*bi,* AND gates 64*cl* to 64*ci* and OR gates 64*dl* to 64*di* where i denotes the number of bits used in the arithmetic operation. The ignition time limiter or modification circuit 331 produces the ignition time signal nα, as described hereinafter.

Figure 4:
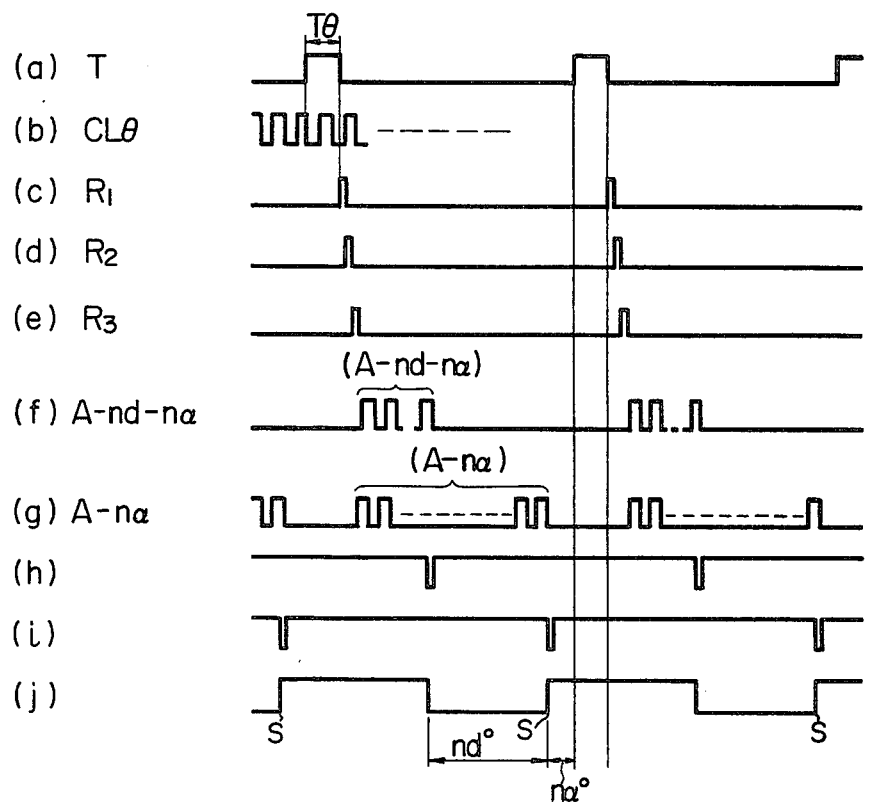
FIG. 4 is a signal waveform diagram to illustrate operations of the arrangements shown in FIGS. 1 and 2.

Next, description will be made on the operations with the aid of the signal waveform diagram shown in FIG. 4. The angle detector 1 shown in FIG. 1 produces the reference signal T having a duration $T\theta$ at a repetition rate of two pulses for every rotation of the crank shaft and the angular pulse signal $CL\theta$ at the pulse repetition rate of one pulse for every rotation angle of 1° of the crank shaft, as illustrated in FIG. 4 at (a) and (b). In the arithmetic unit 3, the decade counter 314 responds to the falling edge of the reference signal T and produces reset pulse signals $R_1$, $R_2$ and $R_3$ in FIG. 4 (c), (d), (e) which correspond, respectively, to the first, third and fifth clock pulses from the oscillator 312 as counted starting from the falling edge of the reference signal T. In this connection, the time span between the falling edge of the reference signal T and the falling edge of the pulse $R_3$ is selected to be sufficiently smaller than the time corresponding to the crank angle of 1° over the whole range of the engine speeds. The clock pulse from the oscillator 312 is also supplied to the AND gate 311 having the other input applied with the reference signal T. The output pulses from the AND gate 311 are counted in the binary counter 313, the contents of which thus corresponds to the number of the clock pulses produced during the pulse duration $T\theta$ of the refeence pulse T. The contents in the counter 313 are transferred to the latch circuit 315 to be stored therein in response to the falling edge of the reset signal $R_2$. Thus, it will be appreciated that the number of clock pulses stored in the latch circuit 315 becomes greater, as the engine speed is lowered. Similarly, in the second detector circuit 32, the negative suction pressure in the intake conduit of the engine is stored in the latch circuit 326 in response to the falling edge of the reset signal $R_2$. The output signals from these latch circuits 315 and 326 are supplied to the ROM 50 of the ignition time limiter circuit 331, which will then output a preset value nα(i) stored in ROM 50 in response to the input signals from the latch circuits 315 and 326. The ignition time signal nα(i−1) of the preceding cycle is transferred to the latch circuit 51 and stored therein at the rising edge of the reset signal $R_1$. In other words, the latch circuit 51 stores therein the actual ignition time point at which the spark was produced during the preceding cycle of a half rotation of the engine. Assuming that the stored value in the latch circuit 51 is represented by nα(i−1), then the output signal of the comparator circuit 52 will be logic "1" if nα(i)>nα(i−1) and logic "0" when nα(i)≦nα(i−1). When nα(i)>nα(i−1), the selector circuit 53 is applied with logic "1" at the input Ka thereby to produce nα(i) at the output thereof, while the selector circuit 54 is applied with logic "1" at the input Kb thereby to produce nα(i−1) at the output thereof. Consequently, the output of the subtraction circuit 56 will be then equal to [nα(i)−nα(i−1)]. On the other hand, when nα(i)<nα(i−1), the selector circuit 53 responds to the input Kb of logic "1" to produce the output nα(i−1), while the selector circuit 54 responds to the input Ka of logic "1" to produce the output nα(i), resulting in the output signal [nα(i−1)−nα(i)] from the subtaction circuit 56. In other words, the subtraction circuit produces the difference between nα(i−1) and nα(i) in the absolute value, i.e. |nα(i)−nα(i−1)|. Now, assuming that |nα(i)−nα(i−1)|>K, the comparator circuit 57 will then produce output signal of logic "1" level. Accordingly, under the conditions that nα(i)≦nα(i−1) and that nα(i−1)−nα(i)>K (referred to as "the first condition"), the AND gate 59 will produce the output signal of logic "1". On the other hand, under the conditions that nα(i)>nα(i−1) and that nα(i)−nα(i−1)>K (referred to as "the second condition"), the AND gate 60 will produce the output of logic "1". Further, NOT gate 61 will produce the output signal of logic "1", if |nα(i)−nα(i−1)|<K (this condition will be referred to as "the third condition"). Further, the adder circuit 62 produces the signal of [nα(i−1)+K], while the substraction circuit 63 produces the output of [nα(i−1)−K]. Through the AND-OR gate array comprising AND gates 64*al* to 64*ci* and OR gates 64*dl* to 64*di* as described hereinbefore, the output nα of the ignition time limiter or modification circuit 331 (FIG. 3) will be [nα(i−1)−K], [nα(i−1)+K] and nα(i), respectively, under the first, second and the third conditions defined above and applied to the subtraction circuit 333 (FIG. 2). The output signals from the subtraction circuits 333 and 335 are (A−nα) and (A−nα−nd), respectively. The up-down counter 336 responds to the falling edge of the pulse $R_3$ to count the angular pulses $CL\theta$ in number corresponding to (A−nα) thereby producing a negative going pulse shown at (i) in FIG. 4. In a similar manner, the up-down counter 337 responds to the falling edge of the pulse $R_3$ to count the angular pulses $CL\theta$ in number corresponding to (A−nα−nd) thereby producing a negative going pulse such as shown at (h) in FIG. 4. The output of the flip-flop constituted by NAND gates 338 and 339 is then a pulse signal rising at the negative going pulse (i) and falling at the negative going pulse (h), as shown in FIG. 4 at (j). When the signal (j) is at the logic "0" level, the transistor 343 is turned off with the transistor 344 being turned on, whereby current is allowed to flow through the primary winding of the ignition coil 41. In response to the rising edge of the pulse (j) (transition to the logic "1" level), the primary current is cut off to induce a high voltage in the secondary winding of the ignition coil 41, which secondary voltage is applied through the distributor 42 to the plugs 43, 44, 45 and 46 to produce sparks. Since each pulse of the signal $CL\theta$ corresponds to the crank angle of 1°, the number of counts represents straightforwardly the instantaneous angle of the crank shaft. Thus, the pulse (h) shown in FIG. 4 is produced at the time point delayed from the falling edge of the pulse $R_3$ by the crank angle of (A−nd−nα)°, while the pulse (i) is produced with a delay of (A−nα)° in terms of the crank angle. Since the angular span between the falling edge of the reference pulse T and the falling edge of the reset pulse $R_3$ is not greater than the crank angle of 1°, the advance angle α becomes equal to nα° on the assumption that the preset value A is made equal to (180−$T\theta$), while the angle corresponding to the duration of logic "0" level of the pulse (j), that is the rotation angle of the crank shaft in which the ignition coil 41 is electrically energized becomes equal to nd°. In this manner, although the advance angle nα° is determined on the basis of the preset value in dependence on the rotation speed and the negative suction pressure of the engine, the ignition time or angle nα(i)° is always compared with the ignition time or angle nα(i−1)° of the preceding cycle by the ignition time limiter or modifying circuit 331. If the difference resulting from the comparison is smaller than the preset value K°, the ignition is effected at the preset ignition time point or angle nα(i)°. On the other hand, when the difference is greater than K°, the advance angle nα is adjusted to be equal to (nα(i−1)+k)° if nα(i)>nα(i−1) and to (nα(i−1)−k)° if nα(i−1)>nα(i), whereby the succeeding ignition time or angle for the current cycle is restricted.

In the case of the illustrated embodiment, an advance angle is read out from ROM 50 in accordance with the actually detected operating speed N and the suction pressure P of the engine, and the arithmetic operation for determining the succeeding ignition time or angle for the current cycle is effected by the ignition time limiter or modification circuit 331, subtraction circuits 333 and 335 and the up-down counters 336 and 337 within the time span between the reset pulses $R_2$ and $R_3$. However, if a longer time is required for such arithmetic operation, the up-down counters 336 and 337 may be reset at a time point delayed for a predetermined crank rotation angle θ' relative to the falling edge of the reference signal T. In such case, the preset value A may be selected equal to 180−Tθ−'.

Figure 5:
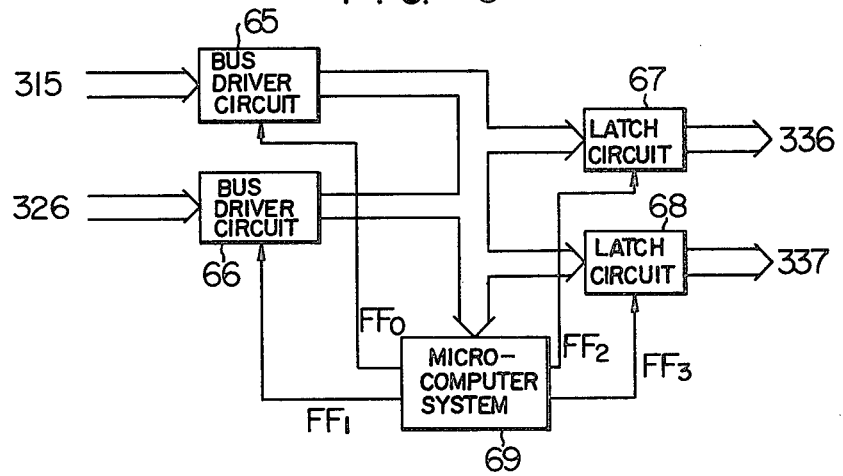
FIG. 5 is a schematic circuit diagram showing a modification of the main portion of the first embodiment.

FIG. 5 shows schematically a main portion of an another embodiment of the invention in which a popular microprocessor is employed. Referring to this figure, the output signal from the latch circuit 315 is applied to the input of a bus driver circuit 65 (which may be TC5012P available from Tokyo Shibaura Electric Industry Co. Ltd. in Japan, for example) which is so designed as to conduct the input signal directly to the output thereof when a control signal to the bus driver is logic "1" and render the output to be of high impedance in response to the control signal of logic "0". The output of the bus driver 65 is connected to the bus line of a microprocessor or micro-computer. In a similar manner, the output of the latch circuit 326 is coupled to a bus driver which has an output coupled to the bus line. The latter is connected to the micro-computer system 69 (e.g. TLCS 12A SYSTEM available from Tokyo Shibaura Co. Ltd.). Under the control of write-in command signals supplied to the bus drivers 65 and 66 from the micro-computer system 69, the signal representative of the engine roation speed N and the signal representative of the suction pressure S are written in the micro-computer 69 through the bus drivers 65 and 66, respectively. The micro-computer 69 will then arithmetically determine the values (A−nα) and (A−nα−nd) which are subsequently transferred to the latch circuits 67 and 68 to be stored therein under the control of read-out command signals. The contents in the latch circuits 67 and 68 are eventually supplied to the up-down counters 336 and 337, respectively.

Next, operation of the micro-computer system 69 will be described by referring to FIG. 6 which is a flow chart illustrating a program executed by the micro-computer. After the start of the program execution, the engine rotation N and the suction pressure P as detected and appropriately conditioned are written in the micro-computer 69 which will then compute the ignition time nα(i) on the basis of the written data, the results of the computation being intermediately stored in registers (not shown) of the micro-computer system 69. Next, the ignition time nα(i−1) of the preceding cycle is read out from a register (also not shown) of the micro-computer 69. When nα(i)−nα(i−1)>0, a decision is made as to whether nα(i)−nα(i−1)>K. If affirmative, then it is determined that nα=nα(i−1)+K. If nα(i)−nα(i−1)≦K, then determination is made such that nα=nα(i). On the other hand, when nα(i)−nα(i−1)≦0, a decision is made whether nα(i−1)−nα(i)>K. If the result is affirmative, determination is made that nα=nα(i−1)−K. If nα(i−1)−nα(i)≦K, then it is determined that nα=nα(i). Subsequently, computations of (A−nα) and (A−nα−nd) are made sequentially.

In the ignition time limiter or modification circuit 331 the ignition time nα(i−1) of the preceding cycle is compared with the arithmetically determined ignition time nα(i) for the succeeding cycle. When nα(i−1)−nα(i)>K, the ignition time or angle nα(i) for the succeeding cycle is modified to [nα(i−1)−K]°. On the other hand, when nα(i)−nα(1−1)>K, the ignition time or angle for the current cycle is modified to [nα(i−1)+K]°. Further, when |nα(i)−nα(i−1)|≦K, the ignition time or angle nα(i) as just arithmetically determined is used without modification for the current cycle. In this manner, the difference in the ignition time or angle between the preceding and the current cycles will not exceed the preset value K°, as a result of which the hunting phenomenon as well as rapid variation in the operating state of the engine can be positively suppressed to assure an enhanced stability in the engine operation.

Figure 7:
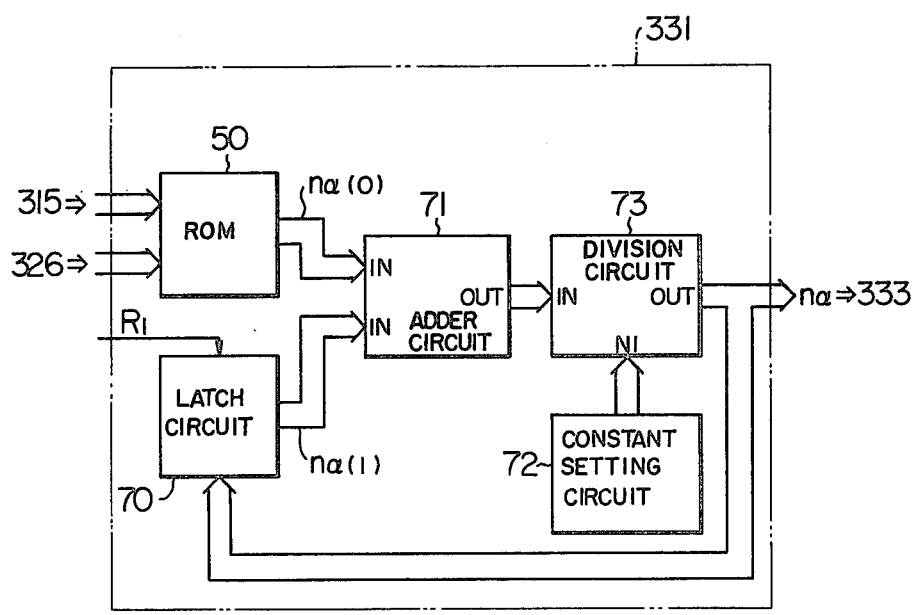
FIG. 7 is a schematic circuit diagram showing the main portion of a second embodiment of the present invention.

FIG. 7 shows a second exemplary embodiment of the ignition time limiter or modifying circuit 331 constituting a part of the ignition timing determinating circuit 33 shown in FIG. 2.

The ignition time limiter circuit 331 shown in FIG. 7 comprises a read-only memory or ROM 50 serving as a programming means, a latch circuit 70 for storing the ignition time nα(1) of the preceding cycle for a delayed time corresponding to a half rotation of the engine, an adder circuit 71 of a conventional type for adding together the output nα(0) of ROM and the output nα(1) of the latch circuit 71, a constant setting circuit 72 for setting a constant "2", and a division circuit 73 of a conventional type for dividing the output of the adder circuit by the constant "2" from the constant setting circuit 72. The ignition time limiter circuit 331 produces the ignition timing or angle signal nα.

Operation of the circuit 331 will be described by referring also to FIGS. 2 and 4.

As described hereinbefore in conjunction with FIG. 2, the signals $R_1$, $R_2$ and $R_3$ shown in FIG. 4 are prepared by the decade counter 314 in dependence on the reference signal T from the detector 1. The clock pulse from the clock source or oscillator 312 is supplied to the AND gate 311 having other input applied with the reference signal T. The output pulses from the AND gate 311 are counted in the binary counter; the contents of which thus correspond to the number of the clock pulses produced during the pulse duration Tθ of the reference pulse T. The count or contents in the counter 313 are transferred to the latch circuit 315 to be stored therein in response to the falling edge of the reset signal $R_2$. Thus, the number of clock pulses stored in the latch circuit 315 becomes greater, as the engine speed is lowered. Similarly, in the second detector circuit 32, the negative suction pressure in the intake conduit leading to the engine is stored in the latch circuit 326 in response to the falling edge of the reset signal $R_2$. The output signals from these latch circuits 315 and 326 are supplied to the ROM 50 of the ignition time limiter circuit 331; which will then output a preset value nα(0) stored in ROM 50 in response to the input signals from the latch circuits 315 and 326. The ignition time signal nα(1) of the preceeding cycle is transferred to a latch circuit 70 and stored therein at the rising edge of the reset signal $R_1$. In other words, the latch circuit 70 stores therein the actual ignition time signal nα(1) at which the spark was produced during the preceding cycle of a half rotation of the engine. The output nα(0) from the ROM 56 and the output nα(1) from the latch circuit 70 are added together by an adder circuit 71, the output of which is thus the sum signal [nα(0)+nα(1)]. The output from the division circuit 73 is then [nα(0)+nα(1)]/2. As the result, the mean value of the ignition time or angle nα(0) just arithmetically determined and the ignition time nα(1) of the preceding cycle is produced as the ignition time output signal nα.

The ignition time signal nα is applied to the input of the subtraction circuit 333 shown in FIG. 2 and is processed in a similar manner described hereinbefore. Namely, the output signals from the subtraction circuits 333 and 335 are (A−nα) and (A−nα−nd), respectively. The up-down counter 336 responds to the trailing edge of the pulse $R_3$ to count the angular pulses $CL\theta$ in number corresponding to (A−nα) thereby producing a negative going pulse shown at (i) in FIG. 4. In a similar way, the up-down counter 337 responds to the falling edge of the pulse $R_3$ to count the angular pulses $CL\theta$ in number corresponding to (A−nα−nd) thereby producing a negative going pulse such as shown at (h). The output of the flip-flop constituted by NAND gates 338 and 339 is then a pulse signal, each pulse having a rising edge at the negative going pulse (i) and a falling edge at the negative going pulse (h), as shown in FIG. 4 at (j). When the signal (j) is at logic "0" level, the transistor 343 is turned off with the transistor 344 being turned on, whereby current is allowed to flow through the primary winding of the ignition coil 41. In response to the rising edge of the pulse (j) or transition thereof to the logic "1" level, the primary current is cut off to induce a high voltage in the secondary winding of the ignition coil 41, which secondary voltage is applied through the distributor 42 to the plugs 43, 44, 45 and 46 to produce sparks. Since each pulse of the signal $CL\theta$ corresponds to the crank angle of 1°, the number of counts represents directly the instantaneous rotation angle of the crank shaft. Thus, the pulse (h) shown in FIG. 4 is produced at the time point delayed from the falling edge of the pulse $R_3$ by the crank angle of (A−nα−nd)°, while the pulse (i) is produced with a delay of (A−nα)° in terms of the crank angle. Since the angular span between the falling edge of the reference signal T and the falling edge of the reset pulse $R_3$ is not greater than the crank angle of 1°, the advance angle α becomes equal to nα° on the assumption that the preset value A is made equal to (180−T$\theta$), while the angle corresponding to the duration of logic "0" level of the pulse (j), that is, the rotation angle of the crank shaft in which the ignition coil 41 is electrically energized becomes equal to nd°.

In this manner, although the advance angle nα° is determined on the basis of the preset value in dependence on the rotation speed, the ignition time for the current cycle is the averaged mean value of the arithmetically determined ignition time and the one of the preceding cycle. Namely, the output ignition time from the limiter circuit 331 is given by [nα(0)+nα(1)]/2.

In the case of the illustrated embodiment, the mean value of nα(0) and nα(1) is determined. However, it will be appreciated that the averaged or mean value may be determined over the preceding K cycles. In such case, the ignition time signal of the limiter circuit is given by [nα(0)+nα(1)+, ..., +nα(K)]/(K+1). Selection of the number of cycles from which the mean value of the ignition times is determined will be made in consideration of ignition characteristics and transient responses such as delay, hunting or the like.

Figure 8:
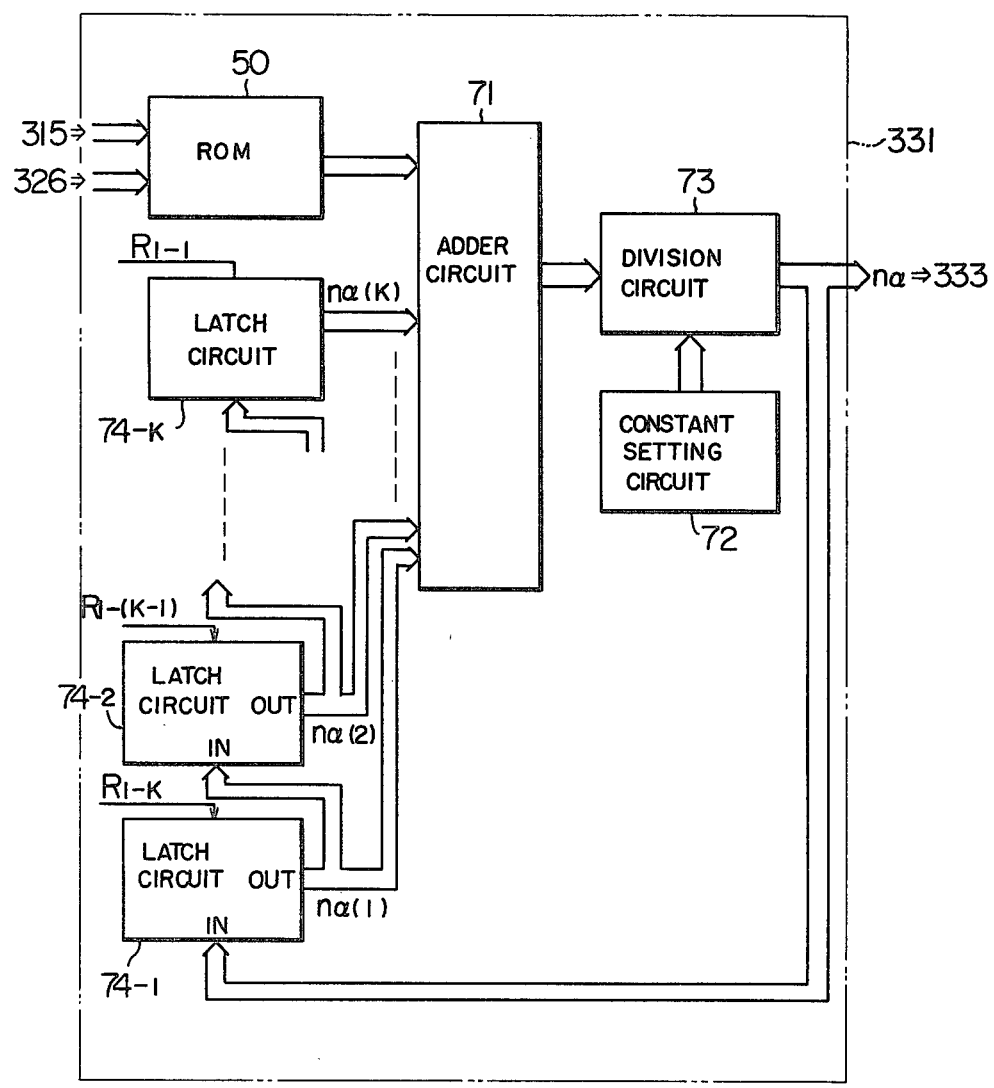
FIGS. 8 and 9 are schematic circuit diagrams showing further modifications of the main portion of the second embodiment.

FIG. 8 shows another exemplary embodiment of the ignition timing limiter circuit according to the invention in which the ignition time for the succeeding cycle is modified in consideration of the averaged or mean values of the ignition times over a plurality of the preceding cycles. Referring to this figure, the ignition timing limiter or modifying circuit comprises ROM 50, K latch circuits 74-1, 74-2, ..., 74-K, an adder circuit 71 for adding together the output signals from ROM 50 and K latch circuits, a constant setting circuit 72 for setting the constant K, and a division circuit 73 for dividing the sum output from the adder circuit 71 by the constant K plus 1. Trigger pulses $R_{1-1}$, $R_{1-2}$, ..., $R_{1-k}$, $R_2$ and $R_3$ are produced by the decade counter 314 shown in FIG. 2. The trigger signals $R_{1-1}$, $R_{1-2}$, ..., $R_{1-k}$ are applied to the associated latch circuits 74-1, 74-2, ..., 74-K each of which is applied with the output of the preceding latch circuit thereby to store the preceding ignition time in a sequential manner in response to the trigger signals. Accordingly, the ignition times nα(K) of the cycle K-times before, nα(K−1) of the cycle (K−1)-times before, ... and nα(1) of the just preceding cycle are stored in the latch circuits 74-K, ... 74-2 and 74-1, respectively, in response to the trigger signals $R_{1-1}$, ..., $R_{1-(k-1)}$ and $R_{1-k}$. The output ignition times from the latch circuits and the output ignition time from ROM 50 are added together by the adder circuit 71, the sum output of which is divided by the constant K plus 1. The ignition time signal nα produced by the circuit shown in FIG. 8 is thus defined by the expression [nα(0)+nα(1)+nα(2)+, ..., +nα(K)]/(K+1).

In the case of the aforementioned embodiment, the advance angle is read out from ROM 50 in accordance with the actual operating speed N and the suction pressure P of the engine, and the arithmetic operation for determining the succeeding ignition time for the current cycle is effected by the ignition time limiter circuit 331 and the subtraction circuits 333 and 335 within the time span between the reset pulses $R_1$ and $R_3$. However, if a longer time is required for such arithmetic operation, the up-down counters 336 and 337 may be reset at a time point delayed for a predetermined crank rotation angle $\theta'$ relative to the falling edge of the reference signal T. In such a case, the preset value A may be selected equal to 180−T$\theta$−$\theta'$.

Figure 9:
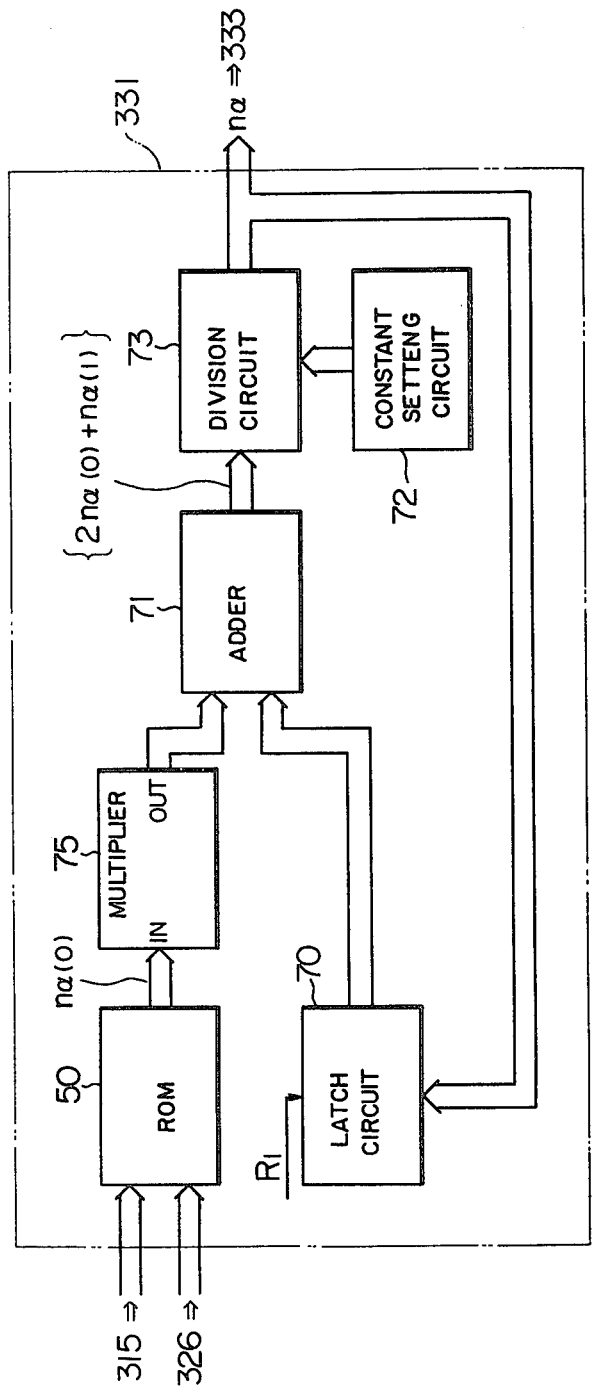

As a modification of the ignition time limiter circuit described just above, it is possible to utilize a weighted mean value of the ignition times of the preceding cycles for producing the ignition time signal for the succeeding cycle. For example, a weighted mean value of the immediately prior ignition time nα(1) and the arithmetically determined one nα(0) (from ROM 50) such as [2nα(0)+nα(1)]/3 may be used as the ignition time signal for the succeeding cycle. An exemplary embodiment of such ignition time limiter or modification circuit is illustrated in FIG. 9 which differs from the circuit shown in FIG. 7 in that the output nα(0) from the ROM 50 is applied to a multiplier 75 which produces the output 2nα(0) applied to the adder 71 and that a constant "3" is set at the constant setting circuit 72. Any desired weighting may be attained by correspondingly selecting the multiplier.

In the foregoing, it has been assumed that the number of rotations and the suction pressure are used as the parameters representing the operating state of the engine for determining the ignition time by reading out the corresponding value from ROM 50 of the ignition time limiter circuit 331 on the basis of the above parameters, it is apparent that other kinds of parameters may be employed. Further, it is preferred that other parameters are used in addition to combination of the rotation speed N and the suction pressure P or intake air flow Ga in order to assure the optimum ignition timing thereby to enhance the operation stability as well as other performances such as purification of exhaust gas or the like. To this end, the advance angles determined by considering also the other parameter are stored in ROM 50 and read out therefrom by inputting the other parameter.

In the above description, it has been assumed that the advance angles stored in ROM 50 are read out in dependence on direct combinations of individual engine parameters. However, it is also possible to use functions of individual parameters. For example, a function of the rotation number f(N) and a function of the suction pressure f(P) may be combined in a form of f(N)+f(P) thereby to facilitate the arithmetic operation required to determine the optimum ignition timing.

Further, the suction pressure in the intake conduit is detected as a negative value in the embodiments described above. However, it is possible to use the absolute value of the suction pressure. In fact, it has been experimentally established that MBT (Minimum advance for Best Torque) is immune to variation in the atmospheric pressure when the suction pressure in the absolute value is constant for an air-fuel mixture of a constant air-fuel ratio. Accordingly, in the case of an engine in which the air-fuel ratio is maintained constant, the detection of the suction pressure in the absolute value advantageously results in that the correction in consideration of the atmospheric pressure is not required.

Further, it has been assumed that an electromagnetic detector is used for producing the reference signal T and the angle signal $CL\theta$. However, an optoelectrical type detector may be substituted for the electromagnetic detector. The above description has been made on the assumption that the invention is applied to a series type four-cylinder engine. However, the invention can be equally applied to a multi-cylinder engine having more than six cylinders. Further, the pulse repetition frequency of the angular signal $CL\theta$ which has been assumed to be 720 pulses for every revolution of the distributor (or a pulse for one degree of the crank angle) may be modified in view of the desired accuracy of the ignition timing, the manufacturing costs or the like. When the angular signal $CL\theta$ having a pulse repetition rate of one pulse for every two degrees of the crank angle is to be produced, then the values A, $n\alpha$ and nd are modified so that the arithmetically determined advance angle is equal to a half of the actually required advance angle.

In summation, the ignition timing has to be controlled with an extremely high accuracy from the viewpoint of economy, purification of exhaust gases and stability in the vehicle operation, which in turn means that the ignition timing control is very sensitive to variations in the operating conditions of the engine. As the result, remarkable hunting phenomenon may occur in the ignition timing control in response to a slight variation in the operating condition of the engine such as variation in cycle. Besides, when the engine can not follow the external variation such as rapid acceleration or deceleration, only the ignition timing will undergo significant variation to impair the running stability of the vehicle. These difficulties can be avoided in the ignition timing control according to the teachings of the invention in that the ignition time $n\alpha(i)$ is always anticipated and compared with the ignition time $n\alpha(i-1)$ of the preceding cycle, wherein when $n\alpha(i-1)-n\alpha(i)>K$, the succeeding ignition time is determined to be $[n\alpha(i-1)-K]$ (modification of $n\alpha(i)$) and when $n\alpha(i)-n\alpha(i-1)>K$, the succeeding ignition time is controlled to $[n\alpha(i-1)+K]$, while for $|n\alpha(i)-n\alpha(i-1)|\leq K$, the arithmetically anticipated ignition time $n\alpha(i)$ is realized without being modified. Thus, the difference in the ignition time between the preceding cycle and the succeeding or following cycle will not exceed the value of K, thereby suppressing the hunting phenomenon, abrupt variation in the ignition timing and the like, whereby a high stability can be assured in the engine operation. For the comparisons described above, a mean value or weighted main value of the instant calculated ignition time and those over a plurality of preceding cycles can be equally used with similar advantages. The invention can be effected regardless of systems of ignition time calculation or control and implemented in numerous types of internal combustion engines.

We claim:

1. In a method for controlling the timing of the ignition spark in a combustion engine having a rotatable output shaft, said ignition spark timing being revised in each rotation cycle of said output shaft, the improvement comprising the steps of:
    storing a first ignition spark timing actually supplied to said internal combustion engine in a preceding rotation cycle of said output shaft;
    anticipating a second ignition spark timing in response to sensed operating conditions of said combustion engine in each current rotation cycle of said output shaft;
    correcting said second ignition spark timing in accordance with said first ignition spark timing to provide a third ignition spark timing which is closer than said second timing to said first timing; and
    supplying said combustion engine with the ignition spark in the current rotation cycle of said output shaft when said output shaft rotates to a position corresponding to said third timing of ignition spark.

2. The improvement according to claim 1, wherein said correcting step includes the steps of:
    deriving a difference between said first timing stored in said storing step and said second timing anticipated in said anticipating step;
    comparing said difference derived in said deriving step with a predetermined value;
    increasing said first timing by said predetermined value when said difference is greater than said predetermined value and said second timing is greater than said first timing; and
    decreasing said first timing by said predetermined value when said difference is greater than said predetermined value and said first timing is greater than said second timing, said increasing and decreasing steps providing a compensated timing as said third timing.

3. In a method for controlling the timing of the ignition spark in a combustion engine having a rotatable output shaft, said ignition spark timing being revised in each rotation cycle of said output shaft, the improvement comprising the steps of:

storing a first ignition spark timing actually supplied to said internal combustion engine in a preceding rotation cycle of said output shaft;

anticipating a second ignition spark timing in response to sensed operating conditions of said combustion engine in each current rotation cycle of said output shaft;

averaging said first timing stored in said storing step and said second timing anticipated in said anticipating step to provide an averaged timing as said third timing; and supplying said combustion engine with the ignition spark in the current rotation cycle of said output shaft when said output shaft rotates to a position corresponding to said third timing of ignition spark.

4. The improvement according to claim 3, wherein said averaging step includes the steps of:

adding said first timing and said second timing; and dividing an addition output of said adding step by two to provide a division output as said averaged timing.

5. The improvement according to claim 3 wherein said averaging step includes the steps of:

multiplying said first timing by a first constant;

multiplying said second timing by a second constant;

adding two outputs of said two multiplying steps; and dividing an addition output of said adding step by a third constant to provide a division output as said averaged timing.

6. Apparatus for controlling the timing of the ignition spark in an internal combustion engine having a rotatable output shaft comprising:

means for sensing, in each rotation of said output shaft, operating conditions of said internal combustion engine;

means for storing, in each rotation of said output shaft, at least one of preceding values indicative of the actual ignition spark timings supplied to said internal combustion engine in the preceding rotations of said output shaft;

means for calculating, in each rotation of said output shaft, a current value indicative of the desired ignition spark timing to be supplied to said combustion engine in the current rotation of said output shaft from said sensed operating conditions;

means for correcting, in each rotation of said output shaft, said calculated current value by said stored at least one of preceding values to provide a corrected value closer than said calculated current value to said at least one of preceding values; and means for supplying, in each rotation of said output shaft, said internal combustion engine with the ignition spark when said output shaft reaches a rotational position corresponding to said corrected value.

* * * * *